United States Patent [19]

Bergeron

[11] Patent Number: 4,660,600
[45] Date of Patent: Apr. 28, 1987

[54] FIRST OUT INDICATOR
[75] Inventor: Ned A. Bergeron, Houma, La.
[73] Assignee: B.W.B. Controls, Inc., Houma, La.*
[21] Appl. No.: 259,594
[22] Filed: May 1, 1981
[51] Int. Cl.$^4$ ............... F16K 37/00; F16K 31/383
[52] U.S. Cl. ............................. 137/552; 137/556; 137/557; 251/29; 251/44
[58] Field of Search ........... 137/553, 555, 556, 557, 137/552; 251/28, 29, 44

[56] References Cited

U.S. PATENT DOCUMENTS

| | | | |
|---|---|---|---|
| 783,447 | 2/1905 | Meloon | 137/556 |
| 2,676,779 | 4/1954 | Boden et al. | 251/44 |
| 3,229,851 | 1/1966 | Horwitt et al. | 137/556 |
| 3,529,420 | 9/1970 | Guyot | 251/44 |
| 3,785,403 | 1/1974 | Kirk | 137/883 |
| 4,116,157 | 9/1978 | Evans | 137/557 |
| 4,121,615 | 10/1978 | Bergeron | 137/557 |
| 4,201,362 | 5/1980 | Nishimi et al. | 251/29 |
| 4,311,296 | 1/1982 | Scheffel | 251/29 |

FOREIGN PATENT DOCUMENTS 2481480  4/1980  France .................. 137/556

Primary Examiner—Alan Cohan
Assistant Examiner—John A. Rivell
Attorney, Agent, or Firm—George A. Bode

[57] ABSTRACT

A control device for determining what one, in a system of monitored functions, first became inoperative.

9 Claims, 4 Drawing Figures

FIRST OUT INDICATOR

BACKGROUND OF THE INVENTION

The presently-used systems for producing oil and gas oftentimes involves monitoring a number of functions at a plurality of locations. As an example, safety or control devices may close a valve, thereby barring fluid passage in a productive line, if the line or supply pressure is greater or lesser than specified parameters. In the situation wherein several system functions are being monitored and a mal-function occurs with respect to one of them, resulting in systems shut down, it is highly desirable to be able to quickly determine the precide malfunction. This invention allows such determination.

SUMMARY OF THE INVENTION

A plurality of the indicators of this invention are pressure connected in parallel to a master relay. Each indicator may indicate whether or not source pressure is received through said master relay. Each such indicator is also in pressure communication with a monitored function, such as pressure, liquid level or the like. On the interruption of such pressure communication between one such indicator and its monitored function, said one indicator provides an indication thereof. Almost simultaneously the master relay is exhausted, thereby barring change in the other indicators.

DESCRIPTION OF A PREFERRED EMBODIMENT

Figure 1:
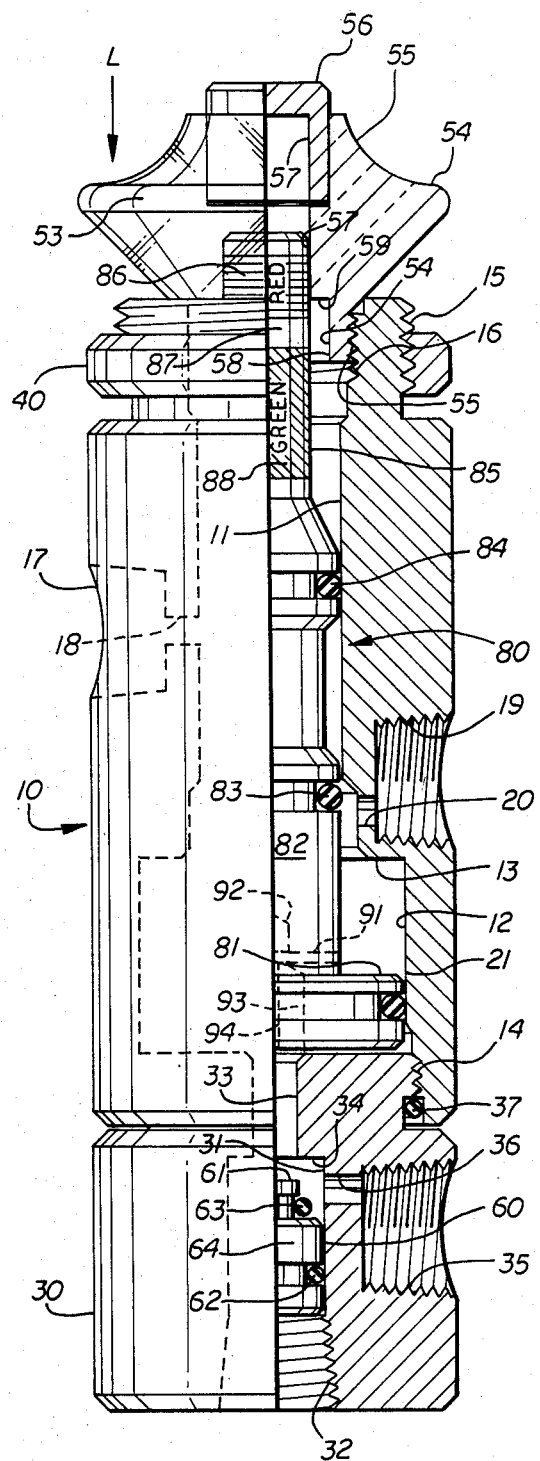
FIG. 1 is a quarter axial section through the device, taken along lines A—A of FIG. 2, showing the device indicating a mal-function.
Figure 2:
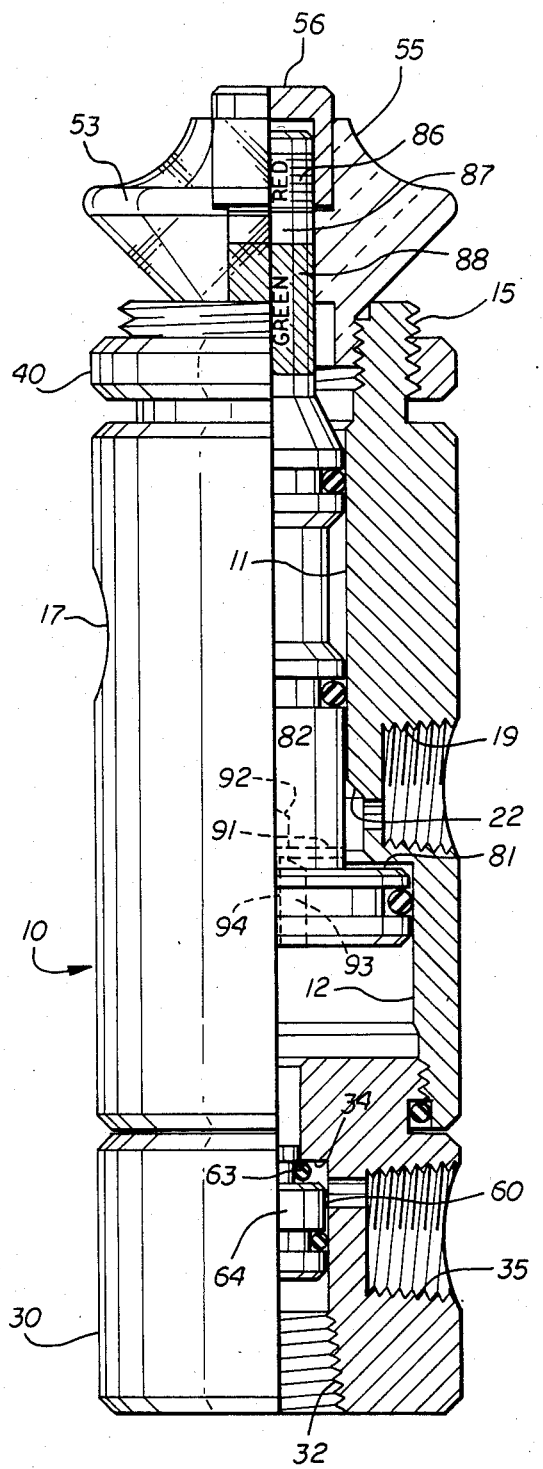
FIG. 2, like FIG. 1, is a quarter axial section, but showing the device as not indicating a malfunction.
Figure 3:
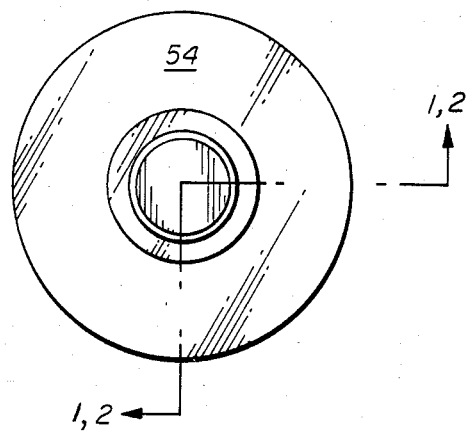
FIG. 3 is a top plan-view showing the display such a malfunction.

Look first at the indicator shown in FIGS. 1 and 3. Cylindrical body 10 includes axial bore 11 and enlarged counterbore 12 connected by shoulder 13.

The lower end of the body includes female threads 14, while the upper end has both male threads 15 and female threads 16, the latter being in the wall of bore 11. Exhaust port 17 communicates with axial bore 11 through lateral bore 18. Supply inlet 19 also communicates with bore 11 but through lateral bore 20.

At the lower end of body 10, cylindrical cap 30 has its male threads engaged with female threads 14 of said body, an O-ring 37 insuring a fluid-tight seal. Cap 30 includes central axial bore 31 threaded at one end 32 to receive a connector fitting and forming thereat instrument pressure inlet. Said bore 31 joins counter bore 33 by virtue of annular shoulder 34. Cap 30 also carries exhaust port 35 which communicates with axial bore 31 through lateral bore 36.

At the opposite end of body 10, a lock-nut 40 may threadedly engage male body threads 15, to fix the indicator on a panel. Female body threads 15 receive male threads 55 provided on nipple extension 53a, said nipple depending from lens 53, said having the overall shape of a truncated cone. Lens 53 would be fabricated of a translucent material so as to diffuse light seen in the direction "L" throughout much of ledge 54. Upwardly depending skirt 53a receives cylindrical shield 56 which, being fabricated of metal, bars light passage therethrough. Lens axial bore 57 communicates with skirt bore 57 and nipple bore 58, the latter occurring through shoulder 59.

Two valve bodies move axially through the indicator of this invention. First small valve body 60 includes piston 64 which moves within cap bore 31. This piston carries depending stem 61, which may removably enter counter bore 33. O-ring 62 is carried by piston 64 for sealing engagement with the I.D. of bore 31. A further O-ring 63 is carried by stem 61 for sealing engagement with shoulder 34, when this valve body is in the up position, indicating the presence of instrument pressure (see FIG. 3). In the down position (FIG. 1) fluid communication exists between exhaust port 35 and counter bore 33.

Consider now the large valve body, generally identified as 80. It includes a large diameter piston 81 which carries a circumferential O-ring for dynamic sealing engagement with the I.D. of counterbore 12. Depending from piston 81 is an axially extended stem 82, which along its length, carries a pair of dynamic O-rings 83,84 for sealing engagement with the I.D. of bore 11. Note that the actual communication between lateral bore 20 adjacent supply inlet occurs via an annual chamferred channel 22 of somewhat greater height than the diameter of seal 83. This reduces seal wear and tear and permits fluid communication between ports 17 and 19 when required, as later described. The end of valve stem 82, opposite piston 81 comprises a nipple extension 85. This extension is divided into signal emission areas 86, 88 separated by an interface area 87. One example of such signal emission would be coloring area 86 red, area 88 green, and intermediate area 87 some distinguishable color. Moving back down stem 82 near piston 81, a lateral orifice 91 passes through the wall of stem 82 to communicate with axial bore 92. Said axial bore, in turn has plug 93 inserted therein, said plug having a central bore 94 extending therethrough to establish communication between lateral orifice 91 and the underside of piston 81.

Figure 4:
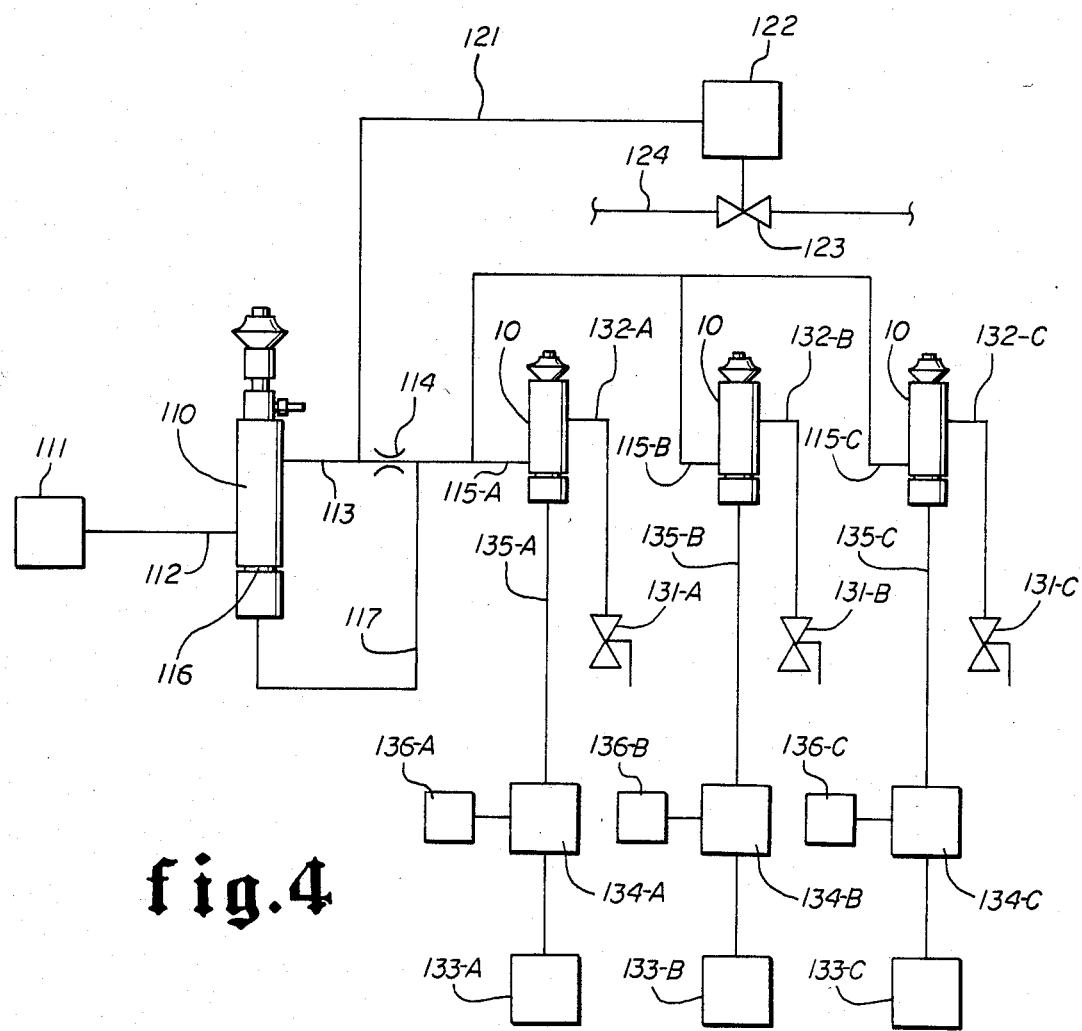
FIG. 4 is a schematic indicating a plurality of indicators parallel connected across a master relay.

Consider now the schematic of FIG. 4. A plurality of indicators 10 of this invention are parallel connected to a master relay 110. Such a relay, as such, does not form a part of this invention, it being known. It would receive fluid under pressure, preferably pneumatic, from supply source 111 through line 112, and provide such fluid pressure to indicator 10 through line 113, orifice 114 and parallel lines 115A, 115B, and 115C. In each case such supply fluid would be provided the respective indicator through inlet 19. Such supply fluid would pass through relay 110 only if fluid pressure within a designated range acts on a piston such as 116 to move a piston (not shown) so as to establish internal communication between lines 112 and 113. Such a relay may be of the type illustrated by U.S. Pat. Nos. 4,094,340, or 4,121,615. In the schematic, such designated pressure enters relay 110, at its bottom, through line 117, branching off line 113, intermediate orifice 114 and indicator 10. A further line 121 branches off line 113 to connect with shut down valve 122. This latter valve retains gate valve 123 open in production line 124 if sufficient pressure is provided through line 121, and closes it otherwise. Further, vent valves 131-a, B and C are connected to exhausts 17 by lines 132-A, B and C. Finally, each indicator 10 receives fluid under pressure at instrument pressure inlet 32 from an instrument pressure source 133-A, B or C, through a pilot or control device 134-A, B or C, and lines 135-A, B or C. Such pilots also known in the art, permit communication between sources 133 and indicator inlets 32 only if their monitored devices 136-A, B or C operates within specific parameters, such as within pressure limits, maintains liquid levels, etc.

Consider now the operation of this invention. Assuming that all systems and components are operative, air under pressure, sat at 30 p.s.i., from source 111 would flow through line 112, master relay 110, and line 113. Some of such air would then pass through line 121, where the pressure exerted on shut-down valve 122, thereby would cause gate valve 123 in production line 124 to remain open. The remaining air in line 113 would flow through orifice 114. Part of the air so flowing through the orifice take the juncture through line 117 to exert a force against relay piston 116, thereby retaining fluid communication between lines 112 and 113 through relay 110. Continuing to follow the path of fluid in line 113, after orifice 114, and other than that detouring through line 117, such remainder may enter supply pressure inlet ports 19 of each of the respective indicators 10 through parallel lines 114-A, B and C.

Assuming that monitored functions 136-A, B and C are properly functioning, then air under pressure from instrument pressure sources 133-A, B and C would pass through controls 134-A, B and C into instrument pressure inlet 32 of each indicator 10, to cause valve 60 to move to the upwardly position of FIG. 3. In this position, O-ring 63 seats against shoulder 34 thereby isolating exhaust 35. Supply pressure from line 115, through inlet 19, passes through lateral conduit 91 and downwardly through communicating passageways 92 and 94, thereafter exerting an upwardly force on the bottom face of piston 81, retaining the piston in the up position. O-ring 83 blocks communication between inlet 19 and exhaust 17. In this position of FIG. 3, portion 86 of the valve stem would be shielded by member 56. Portion 88 would be so positioned relative to lens 53 that a viewer looking in the direction "L" of FIG. 1 would see a band the color of stem portion 88.

Now, assume a mal-function in one of the monitored functions 136-A, B or C, assume it to be in function 136-A. This will result in control 134-A shutting off pressurized fluid from instrument pressure source 133-A to line 135-A, and bleeding air therefrom. Supply pressure through inlet 19 forces valves 60 and 80 downwardly to the FIG. 1 position, thereby opening communication between supply pressure inlet 19 and exhaust 17. This causes stem section 86 to move to the original emitting position. This also results in almost immediate exhausting of lines 115-A, B and C. Now valve 80 of the indicator 10 associated with a mal-function will have moved downwardly prior to such exhaustion. The other indicator valves 80 will not have so moved down on supply pressure exhaustion, therefore will continue to emit the signal associated with stem section 88. Exhausting of supply pressure will naturally cause shut down valve 122 to close gate valve 123 in line 124. On the malfunction being corrected, instrument pressure will again pass from source 133-A through control 134-A, line 135-A, and instrument pressure inlet to cause the small valve 60 to move to the FIG. 3 position, re-starting the cycle.

In order to comply with safety regulations, certain safety devices must be tested periodically. In order to allow such testing without causing system shut-down, any of vent valves 131-A, B or C may be closed to prevent system exhaustion when testing the associated control device 134.

Although only a single embodiment of the invention has been described, it should be obvious that numerous modifications would be possible by one skilled in the art without departing from the spirit of the invention, the scope of which is limited by the following claims.

What is claimed is:
1. First out indicator, comprising:
  a. a housing having first and second fluid inlets, first fluid exhaust means, and a valve receiving passageway;
  b. first valve means reciprocatable in said passageway from a first to a second position;
  c. means for establishing fluid communication between said first fluid inlet and said exhaust means when said first valve means is in said first position and blocking such communication when said first valve means is in said second position;
  d. means for permitting fluid from said first fluid inlet to cause said first valve means to move from said first to said second position when said second fluid inlet is pressurized; and
  e. means for preventing said first valve means from moving from said first to said second position comprising;
    i. second fluid exhaust means in said housing; and
    ii. means for removably blocking communication between said first fluid inlet and second fluid exhaust when second inlet is pressurized.
2. The apparatus of claim 1 wherein said blocking means comprises a second valve means reciprocably moveable in said passageway.
3. The apparatus of claim 1 wherein said permitting means comprises:
  said first valve means having a piston; and
  fluid conduit through said piston whereby said fluid from said first fluid inlet acts against said piston causing such movement.
4. A first out indicator comprising:
  a. a housing having first and second fluid inlets, first and second fluid exhaust means, and a valve receiving passageway;
  b. first valve means reciprocatable in said passageway from a first to a second position, said first valve means including a piston, stem, and first and second signal emitting sections;
  c. means for establishing fluid communication between said first fluid inlet and said exhaust means when said first valve means is in said first position and blocking such communication when said first valve means is in said second position; and
  d. means for causing said first signal emitting section to emit a first signal when said fluid communication is established and a second signal when said fluid communication is blocked.
5. The indicator of claim 4 and including means for moving said first valve means from said first to said second position when both said first and second inlets are sufficiently pressured.
6. The indicator of claim 5 and further including means for restricting the movement of said first valve means from said second to said first position when said second fluid inlet is insufficiently pressured.
7. A system for indicating which of a plurality of monitored functions was first to malfunction, said system comprising:

a. a plurality of indicators connected to a relay, each of said indicators comprising;
  i. a housing having first and second fluid inlets, first and second fluid exhaust means, and a valve receiving passageway;
  ii. first valve means reciprocatable in said passageway from a first to a second position, said first valve means including a piston, stem and means for emitting first and second signals as a function of the position of said first valve means;
  iii. means for causing said first signal to be emitted when both said first and second inlets are sufficiently pressurized;
  iv. means for causing said second signal to be emitted when said second inlet is insufficiently pressurized while said first inlet is sufficiently pressurized;
b. a first fluid source parallel connected to the first fluid inlet of said indicator;
c. second fluid sources connected to the second fluid inlet of each of said indicators; and
d. second valve means within said valve receiving passageway of each of said indicators moveable in response to sufficient pressure from said second fluid inlet and preventing said first valve means of said indicators from moving from their second to their first position when their said first fluid inlets have insufficient pressure.

8. The system of claim 7 wherein said first signal emitting means comprises means for blocking fluid communications between said first fluid inlet and said second fluid exhaust means.

9. The system of claim 8 wherein said first and second signal emitting means comprises a plurality of colors provided on said stem of said first valve means and means for shielding all but one of said colors when said first valve means is in either of said first or second position.

* * * * *